United States Patent Office 3,784,678
Patented Jan. 8, 1974

3,784,678
PROCESS FOR REMOVING IRON FROM PHOSPHORIC ACID
Klaus Beltz, Budenheim (Rhine), Klaus Frankenfeld, Kirberg, Taunus, and Karl Gotzmann, Budenheim (Rhine), Germany, assignors to Chemische Fabrik Budenheim
No Drawing. Filed Sept. 20, 1971, Ser. No. 182,240
Claims priority, application Germany, Sept. 25, 1970,
P 20 47 261.1
Int. Cl. C01b 25/16
U.S. Cl. 423—321    6 Claims

ABSTRACT OF THE DISCLOSURE

A process for removing iron from phosphoric acid. A barium compound is added to the phosphoric acid including sulfate ions to precipitate barium sulfate whereby the iron content of the phosphoric acid is substantially reduced.

This invention relates to the purification of phosphoric acid and more particularly to a process for removing iron from phosphoric acid.

BACKGROUND OF THE INVENTION

Phosphoric acid is generally manufactured in accordance with two processes. In one process, phosphoric acid is produced from phosphate ore by contact with a strong mineral acid, such as sulfuric acid. Phosphoric acid thus produced contains relatively many impurities since constitutents of the phosphate ore form soluble salts with the mineral acid. In the other process, elemental phosphorus produced by the electrothermic reduction of a phosphate ore is oxidized to phosphorus pentoxide which is absorbed by water to form phosphoric acid. Relatively pure phosphoric acid is produced by this second process. Phosphoric acid produced in accordance with former process generally requires purification, especially if the acid is to be used in the manufacture of special optical lenses.

Methods for purifying phosphoric acid produced by contacting a phosphate ore with a strong mineral acid include extraction methods wherein the impure phosphoric acid is admixed with an organic solvent which is immiscible with water. The phosphoric acid, after admixing, is absorbed by the organic solvent and upon phase separation, the oragnic phase is separated from the aqueous phase. Thereafter, the organic solvent is admixed with pure water to reextract the phosphoric acid therefrom to produce substantially pure phosphoric acid. Organic solvents include the higher, water-immiscible alcohols, ester, ethers and the like.

Another extraction method is based upon the solubility difference of phosphoric acid in water and in an organic solvent at various temperatures. Thus, impure phosphoric acid and an organic solvent are admixed at a low temperature whereas the phosphoric acid is more soluble in organic solvent. After phase separation, the organic phase is separated from the aqueous phase and the temperature of the organic phase raised thereby freeing phosphoric acid.

With extraction methods, an equilibrium is established between phases which applies not only to phosphoric acid but also to dissolved impurities. Consequently, the purification achieved is dependent upon the coefficients of separation for the components as well as the number of extraction steps, and within the limits of prevailing technology is only partially satisfactory. While phosphoric acid produced by the electrothermic reduction process is relatively pure, it is known that with storage and transportation, that impurities become dissolved in such phosphoric acid. Iron is the most common impurity found in thermic acid, and as hereinbeforementioned is undesirable where the phosphoric acid is to be utilized in a process for the manufacture of special optical lenses.

Should it be desirable to produce phosphates from phosphoric acid produced by the first method, the acid is neutralized with an alkali metal, alkali earth metal and/or ammonium hydroxide (or related carbonates). Accordingly, the heavy metals and alkali metals precipitate as hydroxides and/or phosphates which are separated from the salt solution by filtration. It is known that hydroxide precipitates are poorly filtered from concentrated salt solutions and that a portion of the precipitate may wind up in the filtrate in the form of peptides. Additionally, phosphorous losses are relatively high since the precipitate of this type may only be poorly and incompletely washed.

Even the use of ion exchange resins for removing iron from phosphoric acid is not satisfactory, since iron will form, in part, phosphate complexes which will not be effectively removed by ion exchange resins. Consequently, prior to using phosphoric acid where high purity phosphoric acid is required, it is necessary to repurify commercially available phosphoric acid.

OBJECTS OF THE INVENTION

An object of this invention is to provide an improved process for purifying phosphoric acid.

Another object of this invention is to provide an improved process for effectively removing iron from phosphoric acid.

DETAILED DESCRIPTION OF THE INVENTION

These and other objects of the invention are accomplished by the surprising discovery that by precipitating barium ions in the presence of sulphate ions from technical grade phosphoric acid there is also a substantial reduction in the amount of iron in the phosphoric acid. This discovery is even more astounding since iron ions are generally unable to form precipitates in strongly acid media with sulphate, phosphate or barium ions. While the theory is not completely understood, it is believed that the removal of iron ions from the phosphoric acid is accomplished by the mechanism of simultaneous precipitation along with the slightly soluble barium sulphate. It has been further discovered that the diminution in the iron content is not only dependent on the amount of precipitated barium sulphate but also on an excess of barium ions with respect to the sulphate ion content of the phosphoric acid whereby an increase in the amount of barium ions leads to a greater diminution in the amount of iron. In contrast, the simultaneous precipitation of iron with barium sulphate is quite independent of the concentration of the phosphoric acid. For procedural reasons, precipitation is carried out in dilute solutions, since it is known that the separation of a barium sulphate precipitate from concentrated viscous fluids is considerably difficult and may even make separation impossible.

A further advantage of the present invention resides in the fact that precipitation of barium can be successfully conducted in phosphoric acid diluted with an organic solvent miscible with phosphoric acid and water in all proportions, such as water-soluble aliphatic alcohols and/or ketones. Dilution of concentrated phosphoric acid with such an organic solvent facilitates separation of the precipitate, since it is easily filtered. The reconcentration of the purified phosphoric acid from such a diluted solution is accomplished with considerably less consumption of energy than when using water alone.

The amount of solvent in the phosphoric acid can vary over a wide range. It has been noted that the process works best if the $P_2O_5$ content of the dilute phosphoric acid is between about 5 and 30 weight percent and the amount of solvent is between about 40 and 90 weight percent.

Since removal of iron from the phosphoric acid is carried out with an excess of barium ions based on the amount of sulphate ions, greater or lesser quantities of barium ions in the form of dissolved salts occur in the phosphoric acid to be purified, and thus results in a new contaminate to the phosphoric acid. However, in contrast to dissolved iron, dissolved barium ions are easily removed from the dilute phosphoric acid by use of a strongly acid cation exchange resin. Therefore, the dilute phosphoric acid solution, substantially free of barium and iron precipitates, is passed through one or more exchangers, after which the thus purified phosphoric acid can be steamed, and as circumstances require, the solvent distilled off.

The removal of iron from the phosphoric acid can in principle be accomplished with any water soluble barium compounds. Furthermore, slightly soluble barium compounds are suitable as cannot possibly form a solution but permit barium ions to dissolve into phosphoric acid. In practice, the barium compounds used include barium hydroxide, barium phosphate, barium carbonate and barium sulphide. The distinguishing features of the process according to the present invention is the removal of iron from phosphoric acid by precipitation with barium ions in the presence of sulphate ions. It is immaterial whether the phosphoric acid from which iron is to be removed has been produced by the wet process and pre-purified by a known phosphoric acid purification step, or whether the phosphoric acid is produced by the electrothermic reduction method and has sebsequently become contaminated with iron during storage, transportation and the like.

When treating unpurified thermic phosphoric acid, a sufficient amount of sulphate ions must be added to the acid to effect the precipitation of iron by barium ions, whereas when treating wet phosphoric acid, in most instances, the amount of sulphate ions remaining from such process is sufficient to form a precipitate with added barium ions. The precipitation process of the invention is not limited to phosphoric acids which contain the contaminants named, but may also be used in the treatment of other phosphoric acids containing other impurities as well as iron and sulphate ions. The amount of barium used is in excess with respect to the amount of sulphate. The effect achieved is dependent as much on the sulphate concentration as on an excess of barium ions. The amount of sulfate ions should be in the range of 0.01 to 0.5 weight percent with respect to the $P_2O_5$ content of the phosphoric acid, and the amount of barium ions should be 2 to 20 times in excess of the amount of sulphate ions.

As hereinabove mentioned, the barium ions remaining in the acid because of the necessity of excess barium ions are removed from the acid by passing the acid through a strongly acid cation exchange resin after filtration. The thus purified phosphoric acid may be brought to final concentration, which in the case of organic solvents, is accomplished by distillation.

EXAMPLES OF THE INVENTION

The following examples are illustrative of conditions for the process of the invention and it is to be understood that the scope of the invention is not to be limited thereby.

Example I

A technical grade phosphoric acid prepared by the wet process subsequently purified contains 52 weight percent $P_2O_5$, 0.05 weight percent Fe ions and 0.2 weight percent $H_2SO_4$. 10 kilograms of this acid are diluted with 20 kilograms of acetone with 200 grams of dry barium carbonate thereafter introduced with vigorous stirring. After a period of 5 minutes, the precipitate is separated from the filtrate by filtration and the filtrate passed through a strongly acid cation exchange resin in the H+— form and is subsequently distilled. In the distillation vessel there remained 9.3 kilograms of a phosphoric acid having a $P_2O_5$ content of 53.0 weight percent, an iron content of 0.003 weight percent and a sulphate content of 0.001 weight percent.

Example II

Phosphoric acid produced by the thermic process and contaminated with iron ions through improper storage had a $P_2O_5$ content of 54 weight percent and an iron content of 0.01 weight percent. 10 kilograms of the acid diluted with 50 kilograms of isopropanol was admixed with 5 grams of concentrated sulphuric acid. 1750 grams of an aqueous barium phosphate solution having a barium content of 8.0% and a $P_2O_5$ content of 19.0% was added with stirring to the phosphoric acid solution. After 10 minutes, the precipitate produced is separated from the solution by filtration. The clean filtrate is passed through a strongly acid cation exchange resin in the H+— form. The organic solvent is removed from the acid by distillation. 10.5 kilograms of a phosphoric acid having a $P_2O_5$ content of 48.5 weight percent and a Fe iron content of 0.0007 weight percent are recovered.

Example III

A technical grade phosphoric acid produced by the wet process and previously purified contains 48.0 weight percent $P_2O_5$, 0.03 weight percent Fe and 0.1 weight percent $H_2SO_4$. 10 kilograms of the acid are diluted with 30 kilograms of water. Into a stirred container, there are added 51 grams of barium hydroxide dissolved in 200 milliliters of carbonatet-free water to the dilute phosphoric acid. After 10 minutes, the precipitate is separated from the solution by filtration with the filtrate being passed through a strongly acid cation exchange resin in the H+—form. The filtration time is limited. 11.0 kilograms of a phosphoric acid are recovered with a $P_2O_5$ content of 41 weight percent and a Fe content of 0.0015 weight percent. Sulphate ions are not demonstrable.

Numerous modifications and variations of the invention are possible in light of the above teachings and therefore the invention may be practiced otherwise than as particularly described.

What is claimed is:

1. A process for removing iron ions from phosphoric acid having iron and sulfate ions which comprises:
    (a) diluting phosphoric acid having a $P_2O_5$ content of between 5 to 30 weight percent with an organic solvent selected from the group consisting of water soluble aliphatic alcohols and ketones and miscible with phosphoric acid and water in all proportions;
    (b) adding barium ions to the solution resulting from step (a), the amount of barium ions added being of from two to twenty times in excess of the amount necessary to precipitate the sulfate ions whereby a precipitate is formed; and
    (c) separating the precipitate from the liquor.
    (d) separating the organic solvent from the liquor and recovering phosphoric acid.
2. The process as defined in claim 1 wherein the barium compound acting as a source of barium ions is selected from the group comprising barium carbonate, barium phosphate, barium hydroxide and barium sulfide.
3. The process as defined in claim 1 wherein the phosphoric acid is diluted with water prior to step (a).
4. The process as defined in claim 1 wherein the phosphoric acid is diluted with an organic solvent miscible with phosphoric acid and water in all proportions in an amount of from 40 to 90 weight percent.
5. The process as defined in claim 1 wherein the sulfate ion is present in a concentration of from 0.01 to 0.5 weight percent with respect to the $P_2O_5$ content of the phosphoric acid.

6. The process as defined in claim 1 wherein the liquor recovered from step (c) is passed through a strongly acidic cation exchange resin.

References Cited

UNITED STATES PATENTS

| | | | |
|---|---|---|---|
| 3,367,738 | 2/1968 | Schallert et al. | 23—165 X |
| 3,554,694 | 1/1971 | Barker et al. | 23—165 X |
| 2,044,940 | 6/1936 | Haag et al. | 23—165 X |
| 3,338,675 | 9/1967 | Gilbert | 23—165 |

FOREIGN PATENTS

| | | | |
|---|---|---|---|
| 552,756 | 12/1956 | Belgium | 23—165 |

OSCAR R. VERTIZ, Primary Examiner

G. A. HELLER, Assistant Examiner